April 29, 1930.  F. AESCHBACH  1,756,078
KNEADING AND MIXING MACHINE, PARTICULARLY FOR PASTE LIKE GOODS
Filed Feb. 21, 1930  2 Sheets-Sheet 1

INVENTOR:

Friedrich Aeschbach
By Henry Orth
atty.

April 29, 1930.                F. AESCHBACH                 1,756,078
        KNEADING AND MIXING MACHINE, PARTICULARLY FOR PASTE LIKE GOODS
                        Filed Feb. 21, 1930        2 Sheets-Sheet 2
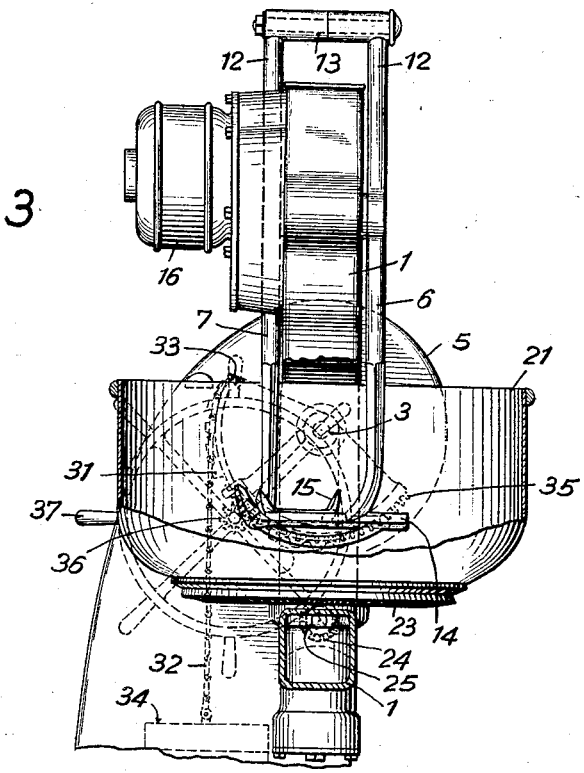
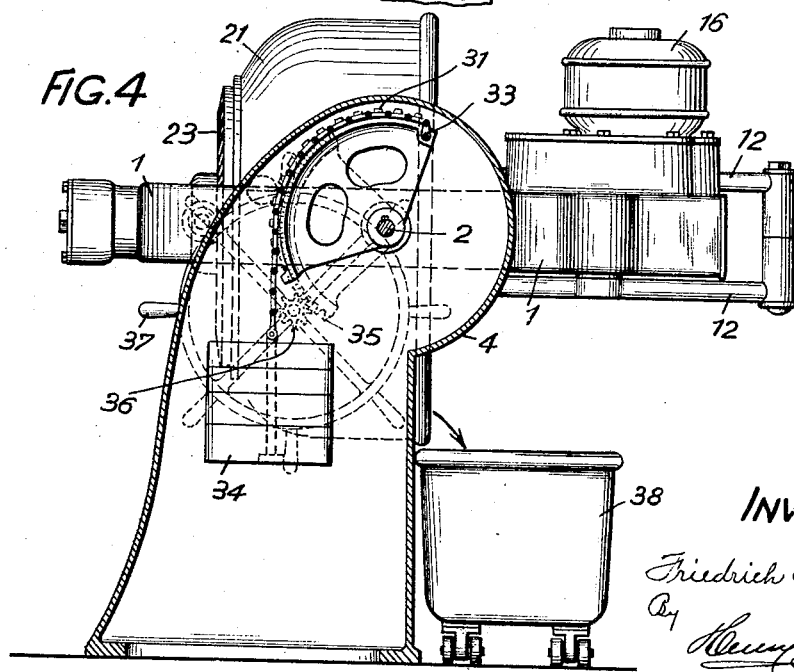
INVENTOR:
Friedrich Aeschbach
By Henry Orth Jr.
       Atty.

Patented Apr. 29, 1930

1,756,078

UNITED STATES PATENT OFFICE

FRIEDRICH AESCHBACH, OF AARAU, SWITZERLAND

KNEADING AND MIXING MACHINE, PARTICULARLY FOR PASTE-LIKE GOODS

Application filed February 21, 1930, Serial No. 430,336, and in Switzerland December 17, 1929.

The known kneading and mixing machines, particularly for paste-like goods, comprising two kneading implements which, by means of two intermeshing gear wheels provided with a crank pin and disposed in a vertical plane, are actuated in such manner that they are moved inside of a rotatable trough in two intersecting elliptical paths, are distinguished by a very good mixing capacity. In the hitherto known two-armed kneading and mixing machines for paste-like goods the two arms are arranged on one side of a standard in which the trough is rotatably mounted. This arrangement has the disadvantage that prior to the tilting of the trough the two arms must be elevated in a high position or removed respectively in order to permit the mixing fingers to be raised above the trough. The said known machines, therefore, had to be provided with devices for elevating the arms to a high position. Besides, the disposition of the two intercrossing arms on one side of the standard involved a certain danger of accident for the operator of the machine.

The object of the invention is to eliminate these disadvantages in that the kneading machine according to the invention is provided with a frame constructed as a closed stirrup which is tiltably mounted and in the upper part of which the drive for the kneading implements is mounted, the one of the said implements being positioned in front of the stirrup and the other behind the stirrup and both implements connected to each other, above the stirrup, whilst the trough is situated in the free space confined by the stirrup and rotatably mounted in the lower part of the latter, the whole arrangement for the purpose of permitting the trough to be emptied of its content without raising or removing the kneading implements respectively and at the same time lessening the danger of accident involved in an arrangement of the kneading implements on the same side of the frame.

The said emptying is considerably simplified by the tilting of the trough, the kneading implements being enabled to remain in operative position during the tilting and even to be actuated during the time in which it occurs so that they can be utilized for assisting to remove the dough from the trough. Thereby, a considerable technical advance is obtained as compared with the known two-armed kneading and mixing machines.

In the accompanying drawing an embodiment of the invention is illustrated, by way of example, in which:

Fig. 3 is a side elevation of the machine, with parts shown in section, and

Fig. 4 a further side elevation, with parts in vertical section, wherein the machine is shown in tilted position.

Figure 1:
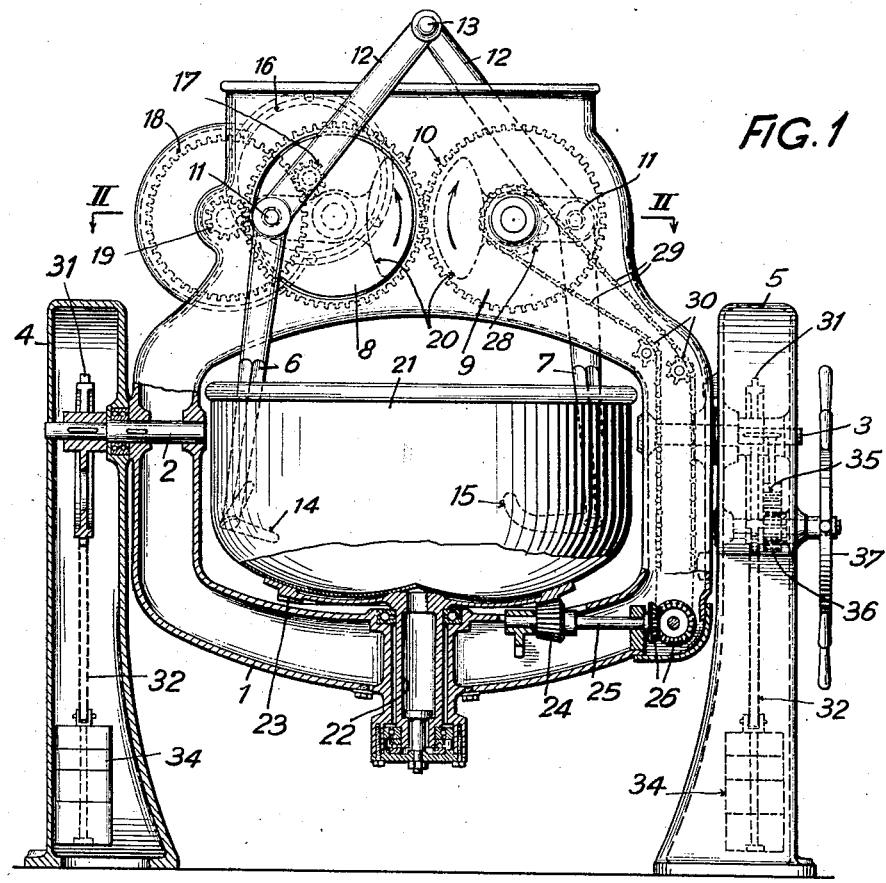
Fig. 1 is a front elevation of the machine, with parts shown in vertical section.
Figure 2:
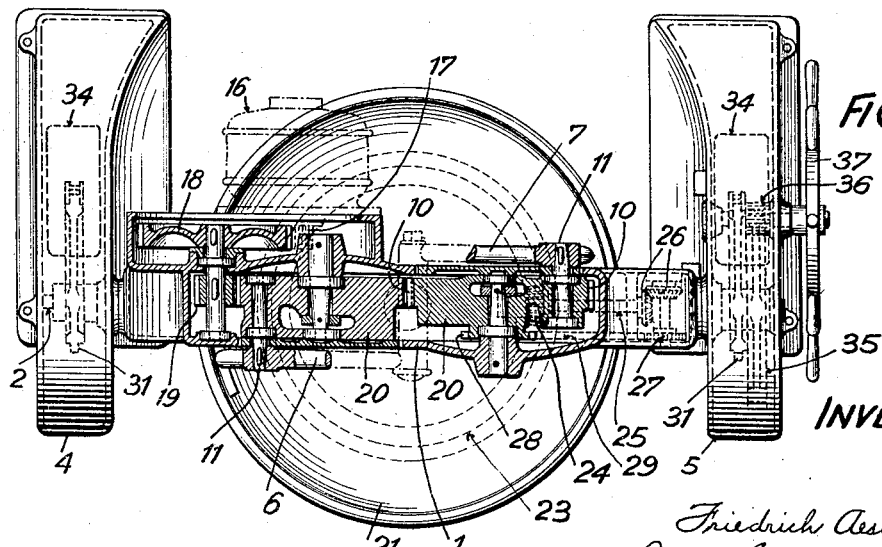
Fig. 2 is a horizontal section on the line II—II in Fig. 1.

The kneading and mixing machine as illustrated on the drawing is provided with a hollow closed stirrup 1 which by means of pins 2 and 3 is tiltably mounted in the two standards 4 and 5. In the upper part of the stirrup the drive members for the two kneading arms or implements 6 and 7 are situated. The latter consist substantially of the two crank disks 8 and 9 which interengage by means of toothed rims 10. The arm 6 is located on one side of the stirrup, in Fig. 1 on the front side, and the arm 7 on the rear side. The said arms are carried on crank pins 11 and their upwardly extending extensions 12 are linked to each other by a common pin 13. When the two crank disks are rotated in the direction of the arrows shown in Fig. 1 the mixing fingers 14 and 15 of the kneading implements are moved through elliptical intersecting paths. The drive of the arms is derived from the electro-motor 16, which is also accommodated in the upper part of the stirrup 1, by way of a toothed pinion 17, toothed wheel 18 and toothed pinion 19 which is in mesh with the toothed rim 10 of the crank disk 8. On their side opposite the crank pins 11 the crank disks are counterbalanced by weights 20.

In the free space confined by the stirrup the trough 21 is located which, by means of the hollow pivot pin 22, is rotatably mounted in the lower part of the stirrup 1. The trough 21 is provided with a bevelled toothed rim 23 which cooperates with a bevel gear wheel 24. The latter is driven by way of the shaft 25, the pair of bevelled gear wheels 26, the chain wheels 27 and 28 and the chain 29. The chain wheel 28 is made in one with the crank disk 9. Guide rollers 30 are provided for the chain 29. The driving members for the two kneading implements 6 and 7 as well as for the trough 21 are housed entirely within the hollow stirrup 1.

To the two pivot pins 2 and 3 segments 31 are keyed to each of which a tension member 32 is connected by means of a connecting link 33 (Fig. 4). To the tension members counter weights 34 are attached which are accommodated inside of the hollow standards 4 and 5. Further, to the pin 3 a toothed segment 35 is secured which cooperates with a toothed pinion 36 which is turnable by a hand wheel 37 from outside of the standard 5 in order to move the stirrup 1 and the trough 21 together with it into the tilted position as shown in Fig. 4. In this position the trough is adapted to discharge its content, for instance, into the dough wagon 38. The weight of the counter weights 34 and the point in which the latter act on the pins 2 and 3 are so chosen that the empty trough together with the stirrup 1 tends to return from the tilted position into the operative position.

The operation of the described mixing machine follows from the above description without any further explanation. With the described machine the danger of accident as compared with the known machines wherein both arms of the kneading implements are situated on the same side of the frame is lessened a great deal. The type of this machine including a tiltable stirrup in which the entire drive is mounted permits that during the tilting of the stirrup the kneading implements and the trough may be maintained operative to scrape the worked dough from the trough.

I claim:

1. A kneading and mixing machine, particularly for dough-like goods, comprising in combination, a frame in the form of a tiltably mounted closed stirrup, two kneading implements the one of which being positioned in front of the said stirrup and the other behind the same and both implements connected to each other above the said stirrup, driving means for said implements and mounted in the upper part of said stirrup and comprising two toothed wheels meshing with each other and disposed in a vertical plane, a crank pin provided on each of the said toothed wheels and engaging one of the said implements and a trough, situated in the space confined by the said stirrup and rotatably mounted in the lower part of the same, and causing the said implements when actuated by the said toothed wheels to move in two intersecting elliptical paths within the said trough.

2. A kneading and mixing machine, particularly for dough-like goods, comprising in combination, a frame in the form of a tiltably mounted closed stirrup, two kneading implements the one of which being positioned in front of the said stirrup and the other behind the same and both implements connected to each other above the said stirrup, driving means for said implements and mounted in the upper part of said stirrup and comprising two toothed wheels meshing with each other and disposed in a vertical plane, a crank pin provided on each of the said toothed wheels and engaging one of the said implements, a trough situated in the space confined by the said stirrup and rotatably mounted in the lower part of the same and causing the said implements when actuated by the said toothed wheels to move in two intersection elliptical paths, within the said trough, and a motor operatively connected to the said driving means, the said motor being carried on the said stirrup, so that during the tilting of the said stirrup the said kneading implements and the said trough are adapted to remain operative to scrape the worked dough from the trough.

3. A kneading and mixing machine, particularly for dough-like goods, comprising in combination, a frame in the form of a tiltably mounted closed stirrup constructed as a hollow body, two kneading implements the one of which being positioned in front of the said stirrup and the other behind the same and both implements connected to each other above the said stirrup, driving means for said implements and mounted in the upper part of said stirrup and comprising two toothed wheels meshing with each other and disposed in a vertical plane, a crank pin provided on each of the said toothed wheels and engaging one of the said implements, a trough, situated in the space confined by the said stirrup and rotatably mounted in the lower part of the same, and causing the said implements when actuated by the said toothed wheels to move in two intersecting elliptical paths within the said trough, and driving means for the said trough, the said driving means for the said kneading implements and for the said trough being enclosed in the hollow space of the said stirrup.

4. A kneading and mixing machine, particularly for dough like goods, comprising in combination, a frame consisting in a tiltably mounted closed stirrup, counter weights for the said stirrup, the heaviness of the said weights and the point in which they act on the said stirrup being so chosen that the said counter weights tend to turn the said stirrup together with the empty trough from the tilted position back into the operative position, two kneading implements the one of which being positioned in front of the said stirrup and the other behind the same and both implements connected to each other above the said stirrup, driving means for said implements and mounted in the upper part of said stirrup and comprising two toothed wheels meshing with each other and disposed in a vertical plane, a crank pin provided on each of the said toothed wheels and engaging one of the said implements, and a trough, situated in the space confined by the said stirrup and rotatably mounted in the lower part of the same and causing the said implements when actuated by the said toothed wheels to move in two intersecting elliptical paths within the said trough.

In testimony whereof I have signed my name to this specification.

FRIEDRICH AESCHBACH.